(12) United States Patent
Kristjansson et al.

(10) Patent No.: US 7,486,815 B2
(45) Date of Patent: Feb. 3, 2009

(54) METHOD AND APPARATUS FOR SCENE LEARNING AND THREE-DIMENSIONAL TRACKING USING STEREO VIDEO CAMERAS

(75) Inventors: Trausti Kristjansson, Newton, PA (US); Hagai Attias, San Francisco, CA (US); John R. Hershey, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1062 days.

(21) Appl. No.: 10/783,709

(22) Filed: Feb. 20, 2004

(65) Prior Publication Data

US 2005/0185834 A1 Aug. 25, 2005

(51) Int. Cl.
G06K 9/00 (2006.01)
H04N 13/02 (2006.01)
H04N 5/225 (2006.01)

(52) U.S. Cl. .................. 382/154; 382/103; 348/47; 348/169

(58) Field of Classification Search ........... 382/103, 382/107, 154, 159, 224, 228, 282, 291; 348/36, 348/42, 47, 153, 154, 155, 169
See application file for complete search history.

(56) References Cited

U.S. PATENT DOCUMENTS

| | | | | |
|---|---|---|---|---|
| 6,542,621 | B1 * | 4/2003 | Brill et al. | 382/103 |
| 7,068,842 | B2 * | 6/2006 | Liang et al. | 382/181 |
| 7,148,913 | B2 * | 12/2006 | Keaton et al. | 348/169 |
| 7,190,809 | B2 * | 3/2007 | Gutta et al. | 382/103 |
| 7,321,854 | B2 * | 1/2008 | Sharma et al. | 704/243 |
| 2003/0103647 | A1 * | 6/2003 | Rui et al. | 382/103 |

OTHER PUBLICATIONS

Schödl, A. et al., "Head Tracking Using a Textured Polygonal Model," Proceedings of Workshop on Perceptual User Interfaces, Nov. 1998.

Frey, B.J. et al., "Learning Graphical Models of Images, Videos and Their Spatial Transformations," Proceedings of the 16th Conference on Uncertainty in Artificial Intelligence, 2000.

Murphy, K. et al., "Sequential Monte Carlo Methods in Practice," Rao-Blackwellised Particle Filtering for Dynamic Bayesian Networks (2000).

Cootes, T.F. et al., "Active Appearance Models," Proceeding of the European Conference on Computer Vision, 1998, vol. 2, pp. 484-498.

Dellaert, F. et al, "Jacobian Images of Super-Resolved Texture Maps for Model-Based Motion Estimation and Tracking," IEEE Workshop on Applications of Computer Vision, Oct. 1998, pp. 2-7.

(Continued)

*Primary Examiner*—Yon Couso
(74) *Attorney, Agent, or Firm*—Theodore M. Magee; Westman, Champlin & Kelly, P.A.

(57) ABSTRACT

A method and apparatus are provided for learning a model for the appearance of an object while tracking the position of the object in three dimensions. Under embodiments of the present invention, this is achieved by combining a particle filtering technique for tracking the object's position with an expectation-maximization technique for learning the appearance of the object. Two stereo cameras are used to generate data for the learning and tracking.

26 Claims, 4 Drawing Sheets

OTHER PUBLICATIONS

Papanikolopoulos, N. et al., "Vision and Control Techniques for Robotic Visual Tracking," Proceeding IEEE Int. Conf. Robotics and Autmation, 1991, vol. 1, pp. 851-856.

Malciu, M. et al., "A Robust Model-Based Approach for 3D Head Tracking in Video Sequences," Proceedings 4th IEEE International Conference on Automatic Face and Geture Recognition, Grenoble, France, Mar. 2000, vol. 1, pp. 169-174.

Blake, A. et al, "Active Contours," Springer-Verlag, 1998.

Tagare, H.D., "A Gentle Introduction to the EM Algorithm. Part I:Theory," 1998, pp. 1-14.

Scharstein, D. et al, "A Taxonomy and Evaluation of Dense Two-Frame Stereo Correspondence Algorithms," International Journal of Computer Vision, No. 47, pp. 7-42, 2002.

* cited by examiner

METHOD AND APPARATUS FOR SCENE LEARNING AND THREE-DIMENSIONAL TRACKING USING STEREO VIDEO CAMERAS

BACKGROUND OF THE INVENTION

The present invention relates to video pattern recognition. In particular, the present invention relates to tracking an object in video data.

Computer vision systems are designed to allow computer systems to extract information from image data. Examples of computer vision systems include 3-D tracking systems that track the three-dimensional movement of an object using successive frames of a video signal, stereo vision systems that build a depth map of a scene using two cameras that provide different perspectives on the scene, and 2-D scene modeling that attempts to build a model to describe a moving object in a scene.

In 3-D tracking systems, the movement of the object is tracked by a single camera based on a strong prior model of what the object looks like. Such models are usually constructed by hand requiring a great deal of work and making it difficult to extend the tracking system to new objects.

Some 3-D tracking systems have relied on particle filtering in which the possible positions of an object are described as particles. At each frame, each particle in a set of particles is scored based on the amount of alignment between the captured image and the prior model positioned at the particle. High scoring particles are retained, while low scoring particles are filtered out. In the next frame, the retained particles are used to propose a new particle set that is grouped around the retained particles. This new particle set is then scored. The high scoring particles in each frame are then used to identify a sequence of positions for the object. Like other 3-D object tracking, particle filtering systems have not been able to learn a model for the appearance of the object. Instead, a strong prior model has been constructed by hand before the system is used for tracking.

In stereo vision systems, the images on two cameras are compared to each other to determine the depth position of particular portions of each image. However, such systems do not produce a generative model of the objects in the images and do not track the movement of objects in successive images.

In 2-D scene modeling, a sequence of images from a single camera is used to learn the appearance of an object as it moves relative to a background. Such systems have not performed well because learning the appearance of objects that can occlude each other is a hard problem when using a single camera.

Thus, a system is needed that improves the performance of scene modeling while allowing 3-D tracking of objects without requiring a strong prior model of the objects.

SUMMARY OF THE INVENTION

A method and apparatus are provided for learning a model for the appearance of an object while tracking the position of the object in three dimensions. Under embodiments of the present invention, this is achieved by combining a particle filtering technique for tracking the object's position with an expectation-maximization technique for learning the appearance of the object. Two stereo cameras are used to generate data for the learning and tracking.

DETAILED DESCRIPTION OF ILLUSTRATIVE EMBODIMENTS

Figure 1:
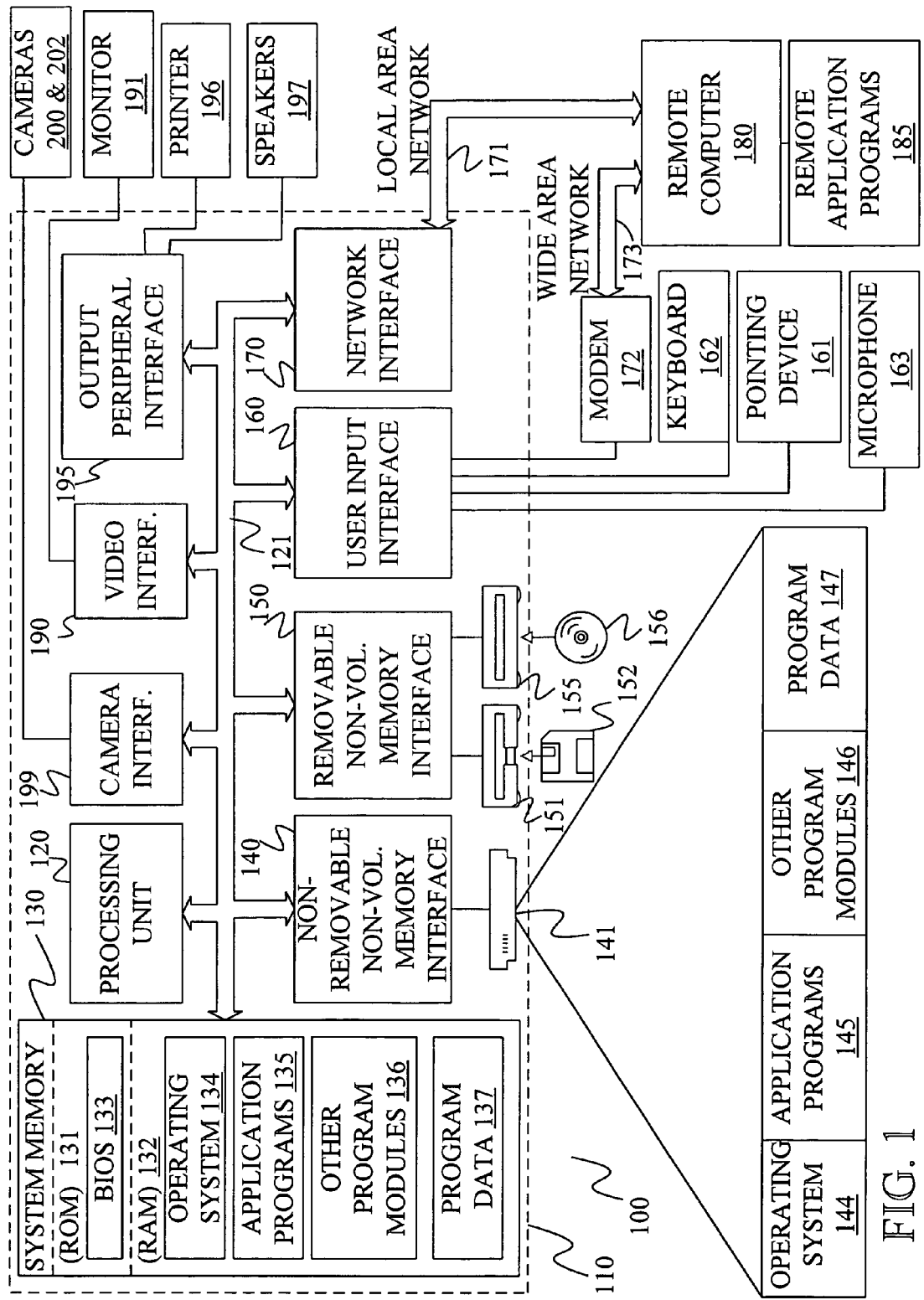
FIG. 1 is a block diagram of one computing environment in which the present invention may be practiced.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention is designed to be practiced in distributed computing environments where tasks are performed by remote processing devices that are linked through a communications network. In a distributed computing environment, program modules are located in both local and remote computer storage media including memory storage devices.

With reference to FIG. 1, an exemplary system for implementing the invention includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). In addition, a pair of cameras 200 and 202 are connected to processing unit 120 through a camera interface 199. Camera interface 199 captures frames of image data from cameras 200 and 202 where each frame consists of a matrix of pixel values for each camera. The pixel values are stored either compressed or uncompressed in RAM 132 or non-volatile memory 141 for later use in tracking the location of an object and learning an appearance of the object capture in the image data.

A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 is operated in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
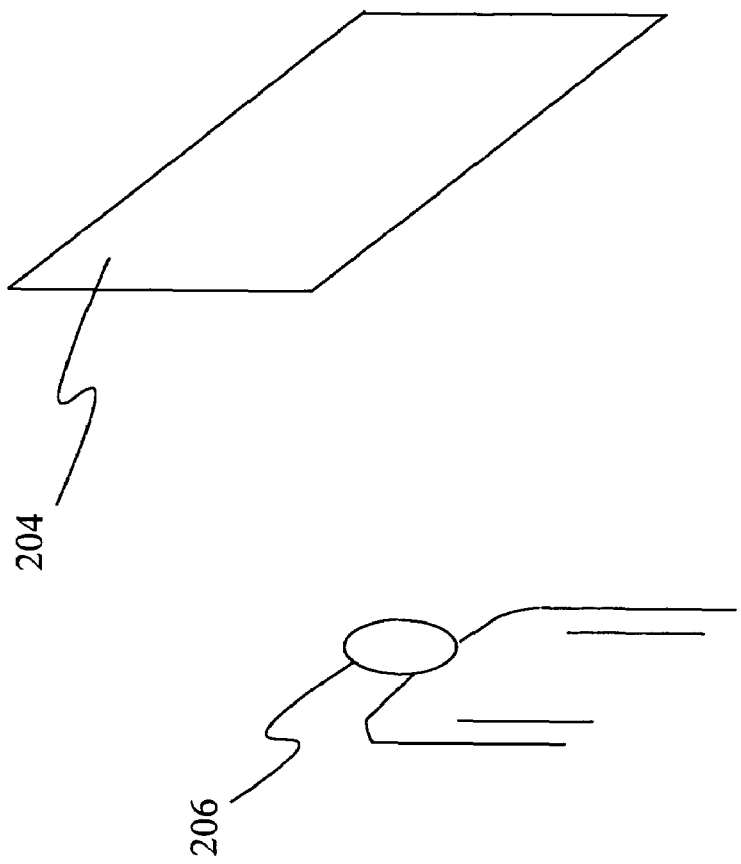
FIG. 2 is a schematic showing the relative positions of a background, an object moving relative to the background and two cameras under one embodiment of the present invention.
Figure 2:
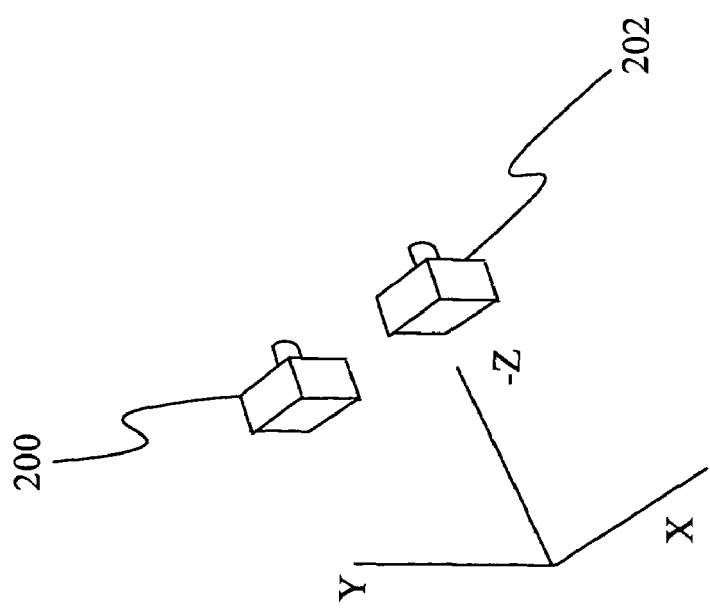

As shown in FIG. 2, embodiments of the present invention use stereo video cameras 200 and 202 and a generative modeling approach to simultaneously learn the appearance of a background 204 and an object 206 while tracking the position of object 206 as it moves relative to background 204. Under one embodiment, the tracking is done in three-dimensions along an X axis, Y axis and −Z axis as shown in FIG. 2.

Figure 3:
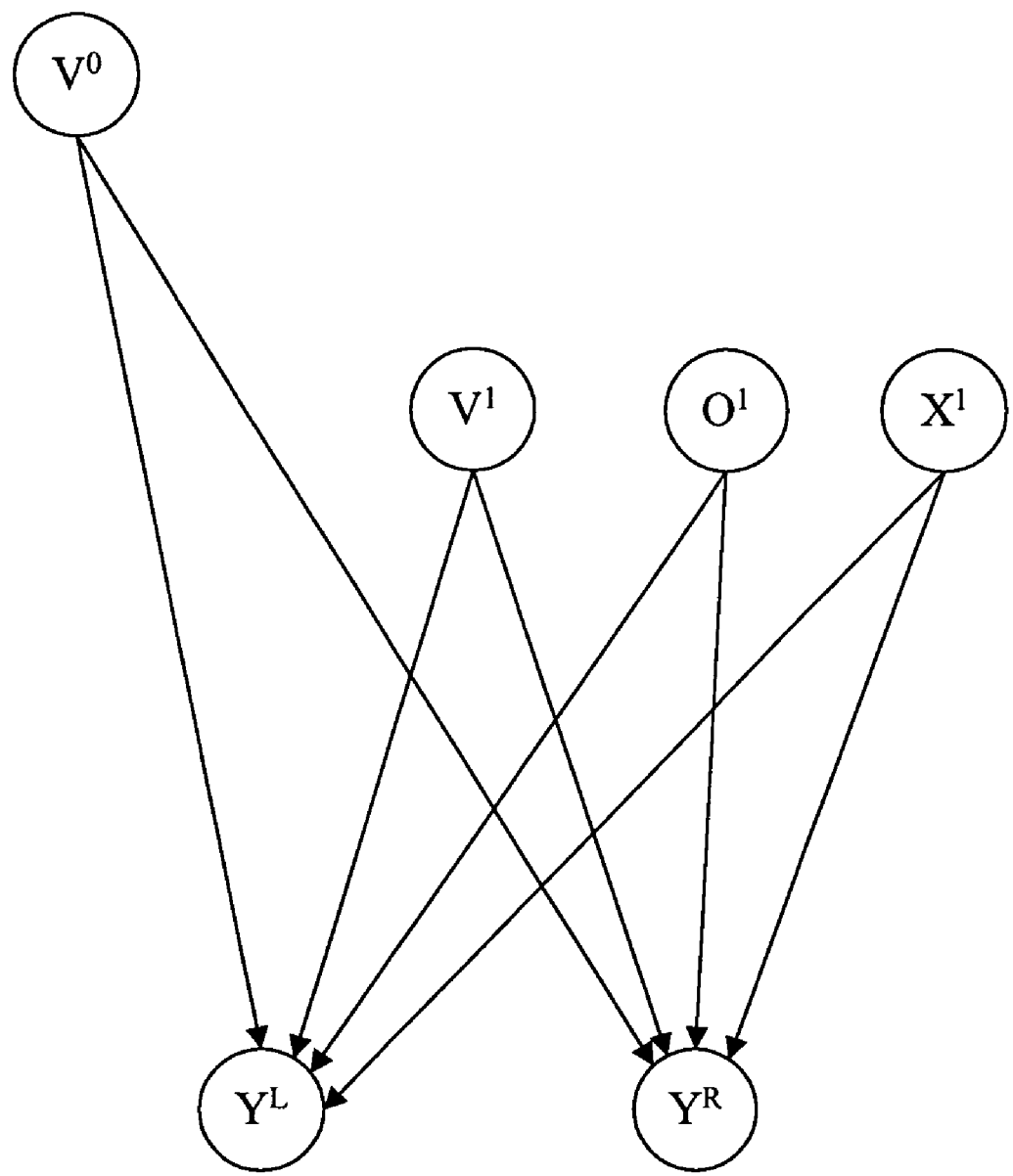
FIG. 3 is a graph of the modeled relationship between the appearance of a background, the appearance of an object, a transparency mask, the position of the object and the images on a left and right camera.

The generative model used by embodiments of the present invention is shown in the graph of FIG. 3. In FIG. 3, $V^0$ is a matrix of pixels representing background 204, $V_1$ is a matrix of pixels representing object 206, $O^1$ is a transparency mask of object 206 that indicates which pixels in the object matrix are transparent, $x^1$ is a vector of at least three coordinates containing the position and orientation of the object, $Y^L$ is a matrix of pixels representing the image observed in left camera 200 and $Y^R$ is a matrix of pixels representing the image observed in right camera 202.

Under the present invention, the appearance of background 204 and the appearance of object 206 are modeled as multivariate Gaussians with diagonal covariance matrices such that:

$$p(V^0) = \prod_j N(v_j^0; \mu_j^0, \eta_j^0) \quad \text{EQ. 1}$$

$$p(V^1) = \prod_i N(v_i^1; \mu_i^1, \eta_i^1) \quad \text{EQ. 2}$$

where $p(V^0)$ is the probability of the appearance of background 204 and $p(V^1)$ is the probability of the appearance of object 206, $v_j^0$ is the value of pixel j in background 204 and $v_i^1$ is the value of pixel i in object 206, $\mu_j^0$ is the mean value for pixel j in background 204 and $\mu_i^1$ is the mean value for pixel i in object 206, and $\eta_j^0$ is the precision of the model for pixel j in background 204 and $\eta_i^1$ is the precision of the model for pixel i in object 206.

Pixels in the object model can be transparent or opaque. This produces a prior distribution for the transparency mask of:

$$p(O^1) = \prod_i [\alpha_i^1 o_i^1 + (1 - \alpha_i^1)(1 - o_i^1)] \quad \text{EQ. 3}$$

where $p(O^1)$ is the probability of the entire transparency mask $O^1$, $o_i^1$ is the transparency value for pixel i, which is either zero or one, and $\alpha_i^1$ is the probability that pixel i is opaque.

The prior distributions for a pixel in the left image and a pixel in the right image are:

$$p(y_{\xi^L(x,i)}^L | V^0, V^1, O^1, x^1) = \begin{cases} N(y_{\xi^L(x,i)}^L; v_i^1, \lambda^L) & \text{if } o_i^1 = 1 \\ N(y_{\xi^L(x,i)}^L; v_{\xi^L(x,i)}^0, \lambda^L) & \text{if } o_i^1 = 0 \end{cases} \quad \text{EQ. 4}$$

$$p(y_{\xi^R(x,i)}^R | V^0, V^1, O^1, x^1) = \begin{cases} N(y_{\xi^R(x,i)}^R; v_i^1, \lambda^R) & \text{if } o_i^1 = 1 \\ N(y_{\xi^R(x,i)}^R; v_{\xi^R(x,i)}^0, \lambda^R) & \text{if } o_i^1 = 0 \end{cases} \quad \text{EQ. 5}$$

where $p(y_{\xi^L(x,i)}^L | V^0, V^1, O^1, x^1)$ is the probability of pixel $y_{\xi^L(x,i)}^L$ in the left image and $p(y_{\xi^R(x,i)}^R | V^0, V^1, O^1, x^1)$ is the probability of pixel $y_{\xi^R(x,i)}^R$ in the right image, $\lambda^L$ is the precision of Gaussian pixel noise associated with the left image and $\lambda^R$ is the precision of Gaussian pixel noise associated with the right image. The functions $\xi^L_{(x,i)}$ and $\xi^R_{(x,i)}$ are transformation functions that transform a pixel location indexed by i on the object into a pixel location indexed on the left and right image respectively.

Thus, when a pixel is opaque (indicated by $o_i^1 = 1$) the pixel in the left and right image where that object pixel strikes the camera should have the value of the object pixel. When the pixel is transparent, the left and right image pixels where the transparent pixel would have landed should have a value equal to the value of the background pixel that passes through the transparent pixel. Note that the background pixels $$v_{\xi^L(x,j)}^0 \text{ and } v_{\xi^R(x,j)}^0$$

are described using the same transformation reference as the image pixel. This occurs because it is assumed that the background is sufficiently far from the cameras so that both cameras capture the same image of the background and the dimensions of the pixel matrix of the background is assumed to be the same as the dimensions of the pixel matrices of the cameras.

The transformation functions $\xi^L_{(x,j)}$ and $\xi^R_{(x,j)}$ are actually the product of a sequence of transformations such that:

$$\begin{bmatrix} j_{rL} \\ j_{cL} \\ 0 \end{bmatrix} = SM \cdot PRS(x) \cdot EYE(L) \cdot W(x) \cdot MO \cdot \begin{bmatrix} i_r \\ i_c \\ 0 \end{bmatrix} \quad \text{EQ. 6}$$

$$\begin{bmatrix} j_{rR} \\ j_{cR} \\ 0 \end{bmatrix} = SM \cdot PRS(x) \cdot EYE(R) \cdot W(x) \cdot MO \cdot \begin{bmatrix} i_r \\ i_c \\ 0 \end{bmatrix} \quad \text{EQ. 7}$$

where $i_r$ is the row of the i-th pixel in the object, $i_c$ is the column of the i-th pixel in the object, $j_{rL}$ is the row of the pixel in the left sensor where the pixel from the object lands, $j_{cL}$ is the column of the pixel in the left sensor where the pixel from the object lands, $j_{rR}$ is the row of the pixel in the right sensor where the pixel from the object lands, and $j_{cR}$ is the column of the pixel in the right sensor where the pixel from the object lands.

The row and column indices are converted into a single dimension index by applying an index_of function such that:

$$\xi^L(x, i) = \text{index\_of}\left(\begin{bmatrix} j_{rL} \\ j_{cL} \\ 0 \end{bmatrix}\right) \quad \text{EQ. 8}$$

$$\xi^R(x, i) = \text{index\_of}\left(\begin{bmatrix} j_{rR} \\ j_{cR} \\ 0 \end{bmatrix}\right) \quad \text{EQ. 9}$$

For example, the function index_of could be defined as $$\xi^L(x, i) = \text{index\_of}\left(\begin{bmatrix} j_{rL} \\ j_{cL} \\ 0 \end{bmatrix}\right) = \text{round}(j_{cL}) \cdot vr + \text{round}(j_{rL}) \quad \text{EQ. 10}$$

$$\xi^R(x, i) = \text{index\_of}\left(\begin{bmatrix} j_{rR} \\ j_{cR} \\ 0 \end{bmatrix}\right) = \text{round}(j_{cR}) \cdot vr + \text{round}(j_{rR}) \quad \text{EQ. 11}$$

where vr is the vertical resolution of the sensor i.e. the number of rows in $Y^R$, and round( ) rounds the value to the nearest integer.

In Equations 6 and 7 MO is a transformation from the matrix indices of the object to physical coordinates where the centroid (i.e. element (n,n) in an 2n−1×2n−1 matrix) of the matrix is assumed to be positioned at a point directly between the two cameras that is designated as coordinates (0,0,0), W(x) is a transformation that shifts the physical coordinates of the object based on the position of the object in space, EYE(L) and EYE(R) are transformations due to the position of the left and right cameras, respectively, where EYE(L) is a shift of +5 along the x axis for the left camera and EYE(R) is a shift of −5 along the x axis for the right camera when the cameras are positioned at (−5,0,0) and (5,0,0), respectively, PRS(x) is a perspective projective transformation that decreases the values of the x and y coordinates as a function of the −z coordinate to provide for shrinking of the object as it moves away from the cameras, and SM maps from the physical sensor coordinates in the camera to the pixel row and column indices of the camera.

Those skilled in the art will comprehend that the transformations from the object to the camera may be inverted so that a pixel index for either of the cameras can be mapped to a pixel on the object.

Although the space coordinates are described above with three coordinates, in many embodiments homogenous coordinates are used that allow translations and perspective projections to be performed in a consistent framework. A point in homogenous coordinates includes a fourth component h, i.e. (x,y,z,h).

To determine the parameters that describe the appearance of the object and the background and whether a pixel in the object is transparent, the present invention uses a hybrid of particle filtering and Expectation-Maximization (EM) training. By utilizing particle filtering to track the position x of the object, the present invention avoids having to integrate over all possible positions for the object in each frame. In addition, using particles greatly reduces the connectivity of the graph of FIG. 3.

Without the use of particle filtering, each pixel in the object could conceivably connect to each pixel in each camera depending on the position of the object. Thus, if the object is in one position, a pixel on the object would strike a first pixel in the camera. However, if the object is in a second position, the same pixel on the object would strike a second pixel in the camera. By using particle filtering, the possible positions and orientations for the object are greatly reduced in each frame thereby reducing the number of connections between the object and the camera. This reduction in the number of connections allows the graph of FIG. 3 to be factored so that inference of the appearance models is more efficient.

Figure 4:
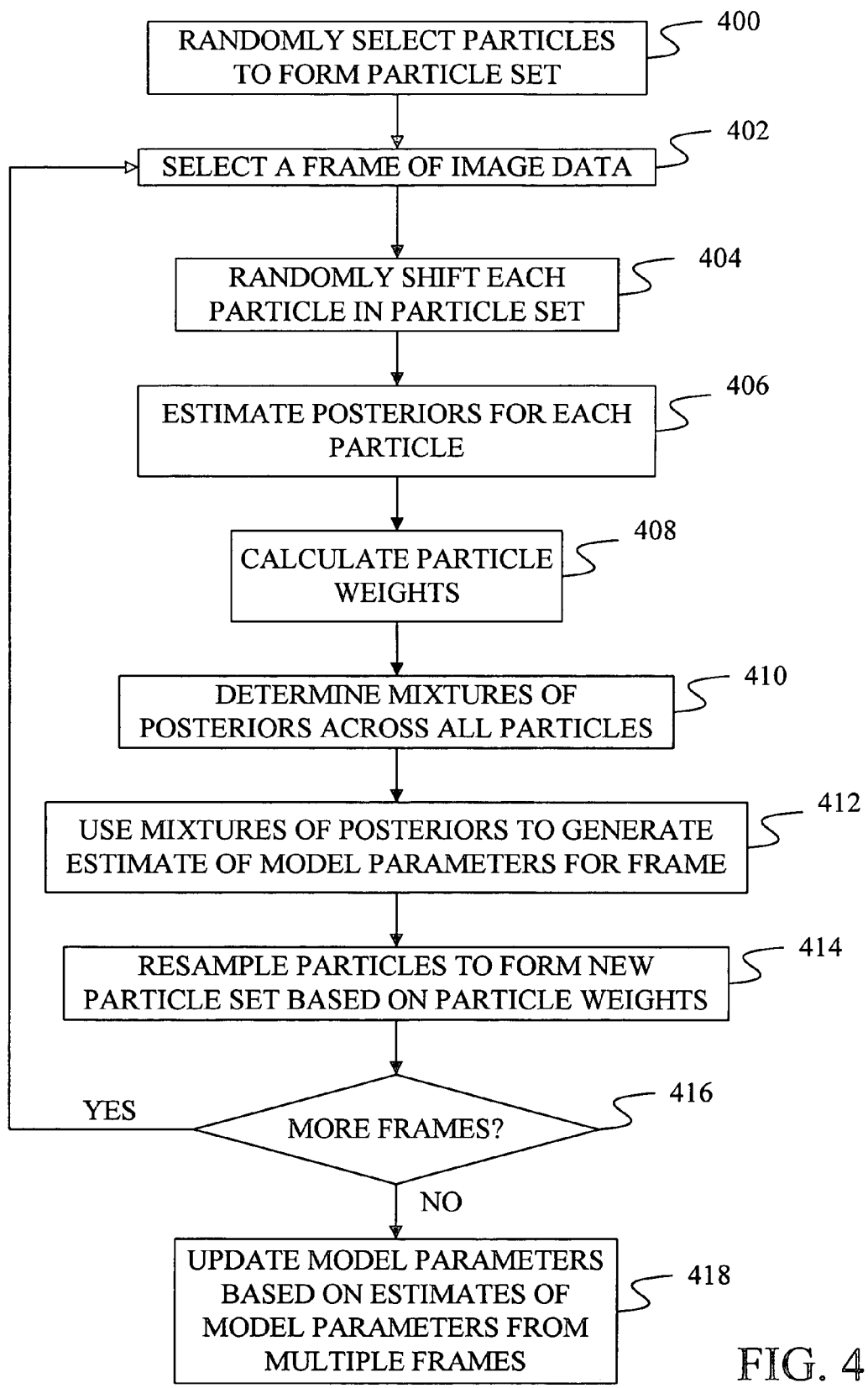
FIG. 4 is a method tracking objects and learning an appearance model under one embodiment of the present invention.

FIG. 4 provides a flow diagram of the hybrid EM-particle filtering technique for building the appearance models of the object and background while tracking the object's movement. At step 400, a set of particles is randomly selected to represent possible positions for the object. Under one embodiment, four hundred particles were used.

At step 402, the first frame of the image data is selected. In the discussion below, a frame of image data includes values for each pixel in the left and right camera that are captured at the same time. After the frame has been selected, the particles are passed through a dynamic distribution to randomly shift each of the particles slightly at step 404. The reason for shifting the particles is discussed further below.

Using the shifted particles, an estimate of the posterior distributions for the appearance of the object $v_i^1$, the appearance of the background $v_j^0$, the position $x^1$ and the transparency mask $o_i$ are determined at step 406. The posterior for the appearance of the object at each pixel i is a mixture of two Gaussians:

$$p(v_i^1 \mid x, y^L_{\xi L(x,i)}, y^R_{\xi R(x,i)}) = c\alpha_i^1 w_1 N(v_i^1; \mu_{opaque}, \eta_{opaque}) +$$
$$c(1 - \alpha_i^1) w_0 N(v_i^1; \mu_{transparent}, \eta_{transparent})$$
EQ. 12 where $$\mu_{opaque} = \frac{1}{\eta_i^1 + \lambda^L + \lambda^R} \left[ \eta_i^1 \mu_i^1 + \lambda^L y^L_{\xi L(x,i)} + \lambda^R y^R_{\xi R(x,i)} \right]$$
EQ. 13

$$\eta_{opaque} = \eta_i^1 + \lambda^L + \lambda^R$$
EQ. 14

$$\mu_{transparent} = \mu_i^1$$
EQ. 15

$$\eta_{transparent} = \eta_i^1$$
EQ. 16

$$w_1 = N\left(y^L_{\xi L(x,i)} - y^R_{\xi R(x,i)}; 0, \frac{\lambda^L \lambda^R}{\lambda^L + \lambda^R}\right) \cdot$$
EQ. 17
$$N\left(\frac{1}{\lambda^L + \lambda^R}\left[\lambda^L y^L_{\xi L(x,i)} + \lambda^R y^R_{\xi R(x,i)}\right]; \mu_i^1, \frac{(\lambda^L + \lambda^R)\eta_i^1}{\lambda^L + \lambda^R + \eta_i^1}\right)$$

$$w_0 = N\left(y^L_{\xi L(x,i)}; \mu^0_{\xi L(x,i)}, \frac{\eta^0_{\xi L(x,i)} \lambda^L}{\eta^0_{\xi L(x,i)} + \lambda^L}\right) \cdot$$
EQ. 18
$$N\left(y^R_{\xi R(x,i)}; \mu^0_{\xi R(x,i)}, \frac{\eta^0_{\xi R(x,i)} \lambda^R}{\eta^0_{\xi R(x,i)} + \lambda^R}\right)$$

c is a normalizing constant and $\alpha_i^1$ is the prior for the mask variable.

This is an intuitive result. The posterior probability is seen to be a mixture of a Gaussian for when the object pixel is opaque and a Gaussian for when the object pixel is transparent. The mode of the opaque Guassian, $\mu_{opaque}$, is the weighted average of what is observed in the two cameras, $y^L_{\xi L(x,i)}$ and $y^R_{\xi R(x,i)}$, and the prior mode $\mu_i^1$. The mode of the transparent Gaussian, $\mu_{transparent}$, is equal to the prior mode $\mu_i^1$, since the cameras do not provide any new information as to the value of the transparent pixel.

The opaque Gaussian is weighted by $w_1$, which more heavily weights the opaque distribution if the particle is close to the actual position of the object such that both cameras detect the same value for the pixel and/or the average values detected by the cameras matches the prior value for the pixel. The transparent Gaussian is weighted by $w_0$, which provides an indication of whether the pixel is truly transparent.

We need to calculate sufficient statistics for the eventual re-estimation of the parameters in the M-step. These are:

$$\bar{\mu}_{i,x}^1 = w_1 \mu_{transparent} + w_0 \mu_{opaque}$$
EQ. 19

$$\beta_{i,x}^1 = w_1 \mu_{transparent}^2 + w_0 \mu_{opaque}^2$$
EQ. 20

$$\chi_{i,x}^1 = w_1 \eta_{transparent} + w_0 \eta_{opaque}$$
EQ. 21

The posterior for the appearance of the background is determined as:

$$p(v_j^0 \mid x, Y^L Y^R) =$$
EQ. 22
$$w_{00} N(v_j^0; \mu_{left+right}, \eta_{left+right}) + w_{01} N(v_j^0; \mu_{right}, \eta_{right}) +$$
$$w_{10} N(v_j^0; \mu_{left}, \eta_{left}) + w_{11} N(v_j^0; \mu_{opaque}, \eta_{opaque})$$

Where

-continued $$\mu_{left+right} = \frac{1}{\lambda^L + \lambda^R + \eta_j^0}[\lambda^L y_j^L + \lambda^R y_j^R + \eta_j^0 \mu_j^0] \qquad \text{EQ. 23}$$

$$\eta_{left+right} = \lambda^L + \lambda^R + \eta_j^0 \qquad \text{EQ. 24}$$

$$\mu_{right} = \frac{1}{\lambda^R + \eta_j^0}[\lambda^R y_j^R + \eta_j^0 \mu_j^0] \qquad \text{EQ. 25}$$

$$\eta_{right} = \lambda^R + \eta_j^0 \qquad \text{EQ. 26}$$

$$\mu_{left} = \frac{1}{\lambda^L + \eta_j^0}[\lambda^L y_j^L + \eta_j^0 \mu_j^0] \qquad \text{EQ. 27}$$

$$\eta_{left} = \lambda^L + \eta_j^0 \qquad \text{EQ. 28}$$

$$\mu_{opaque} = \mu_j^0 \qquad \text{EQ. 29}$$

$$\eta_{opaque} = \eta_j^0 \qquad \text{EQ. 30}$$

$$w_{00} = c(1-\alpha_{i_R})(1-\alpha_{i_L})N\left(y_j^R - y_j^L; 0, \frac{\lambda^R \lambda^L}{\lambda^R + \lambda^L}\right) \qquad \text{EQ. 31}$$

$$w_{10} = c(1-\alpha_{i_L})\alpha_{i_R} N\left(y_j^R; \mu_{i_R}^1, \frac{\lambda^R \eta_{i_R}^1}{\lambda^R + \eta_{i_R}^1}\right) \qquad \text{EQ. 32}$$

$$w_{01} = c(1-\alpha_{i_R})\alpha_{i_L} N\left(y_j^L; \mu_{i_L}^1, \frac{\lambda^L \eta_{i_L}^1}{\lambda^L + \eta_{i_L}^1}\right) \qquad \text{EQ. 33}$$

$$w_{11} = c\alpha_{i_L}\alpha_{i_R} N\left(y_j^L; \mu_{i_L}^1, \frac{\lambda^L \eta_{i_L}^1}{\lambda^L + \eta_{i_L}^1}\right) N\left(y_j^R; \mu_{i_R}^1, \frac{\lambda^R \eta_{i_R}^1}{\lambda^R + \eta_{i_R}^1}\right) \qquad \text{EQ. 34}$$

Where the subscripts, $i_R$ and $i_L$, indicate pixel i in the object, which is identified by applying the inverse of the transforms of equations 6-10 to the pixel index j of the cameras.

Again, we need to calculate sufficient statistics for the eventual re-estimation of the parameters in the M-step. These are:

$$\bar{\mu}_{j,x}^0 = w_{00}\mu_{left+right} + w_{01}\mu_{right} + w_{10}\mu_{left} + w_{11}\mu_{opaque} \qquad \text{EQ. 35}$$

$$\beta_{j,x}^0 = w_{00}\mu_{left+right}^2 + w_{01}\mu_{right}^2 + w_{10}\mu_{left}^2 + w_{11}\mu_{opaque}^2 \qquad \text{EQ. 36}$$

$$\chi_{j,x}^0 = w_{00}\eta_{left+right} + w_{01}\eta_{right} + w_{10}\eta_{left} + w_{11}\eta_{opaque} \qquad \text{EQ. 37}$$

The posterior for the transparency mask is determined as:

$$p(o_i^1 = 1, x, y_{\xi L(x,i)}^L, y_{\xi R(x,i)}^R) = \qquad \text{EQ. 38}$$
$$p(x)\alpha_i N\left(y_{\xi R(x,i)}^R - y_{\xi L(x,i)}^L; 0, \frac{\lambda^R \lambda^L}{\lambda^R + \lambda^L}\right)$$
$$N\left(\mu_i^1; \frac{\lambda^R y_{\xi R(x,i)}^R + \lambda^L y_{\xi L(x,i)}^L}{\lambda^R + \lambda^L}, \frac{(\lambda^R + \lambda^L)\eta_i^1}{\lambda^R + \lambda^L + \eta_i^1}\right)$$

$$p(o_i^1 = 0, x, y_{\xi L(x,i)}^L, y_{\xi R(x,i)}^R) = \qquad \text{EQ. 39}$$
$$p(x)(1-\alpha_i)N\left(y_{\xi L(x,i)}^L; \mu_{\xi L(x,i)}^0, \frac{\lambda^L \eta_{\xi L(x,i)}^0}{\lambda^L + \eta_{\xi L(x,i)}^0}\right)$$
$$N\left(y_{\xi R(x,i)}^R; \mu_{\xi R(x,i)}^0, \frac{\lambda^R \eta_{\xi R(x,i)}^0}{\lambda^R + \eta_{\xi R(x,i)}^0}\right)$$

Hence $$p(o_i^1 = i, x, y_{\xi L(x,i)}^L, y_{\xi R(x,i)}^R) = \frac{p(o_i^1 = i, x, y_{\xi L(x,i)}^L, y_{\xi R(x,i)}^R)}{p(o_i^1 = 0, x, y_{\xi L(x,i)}^L, y_{\xi R(x,i)}^R) + p(o_i^1 = 1, x, y_{\xi L(x,i)}^L, y_{\xi R(x,i)}^R)} \qquad \text{EQ. 40}$$

The posterior for the position variable x is represented by the particle set $\{x_s\}$ and associated weights $\{q(x_s)\}$. The posterior distribution for the position x can be approximated as the associated weight at the position of the particles $x_s$:

$$p(x_s | Y^L, Y^R) \approx q(x_s) = \frac{p(x_s, Y^L, Y^R)}{\sum_k p(x_k, Y^L, Y^R)} \qquad \text{EQ. 41}$$

To arrive at an expression for the weight of a particle, we need to integrate over all parametric distributions (Rao-Blackwellization). By doing so, $p(x_s, Y^L, Y^R)$ can be shown to be:

$$p(x_s, Y^L, Y^R) = \prod_i [\alpha_i^1 w_1(i) + (1-\alpha_i^1)w_0(i)] \qquad \text{EQ. 42}$$

where i is a pixel index, and $\alpha_i^1$, $w_1(i)$ and $w_0(i)$ are as defined above.

Although the posterior for the position is determined when the weight of the particle is determined, the determination of the particle weights is shown as a separate step 408 in FIG. 4 to clearly show that the particle weights are being determined.

Note that the posteriors for the appearance of the object and the background and the posterior for the transparency mask shown above are for particular positions of the object. The approximate complete posteriors for the frame are written as a mixture of Guassians, with each particle representing a separate mixture component. Each Gaussian in the mixture is weighted by a particle weight $q(x_s)$. Thus, the mixtures of the posteriors for the frame are determined at step 410 as:

$$p(v_i^1 | y_{\xi L(x,j)}^L, y_{\xi R(x,j)}^R) = \sum_{x_s} q(x_s) p(v_i^1 | x_s, y_{\xi L(x,j)}^L, y_{\xi R(x,j)}^R) \qquad \text{EQ. 43}$$

$$p(v_i^0 | y_{\xi L(x,j)}^L, y_{\xi R(x,j)}^R) = \sum_{x_s} q(x_s) p(v_i^0 | x_s, y_{\xi L(x,j)}^L, y_{\xi R(x,j)}^R) \qquad \text{EQ. 44}$$

$$p(o_i^1 | y_{\xi L(x,j)}^L, y_{\xi R(x,j)}^R) = \sum_{x_s} q(x_s) p(o_i^1 | x_s, y_{\xi L(x,j)}^L, y_{\xi R(x,j)}^R) \qquad \text{EQ. 45}$$

At step 412, the per frame sufficient statistics for the model parameters are calculated. These estimates are calculated as:

$$\alpha_i^1 = \sum_{x_s} q(x_s) \alpha_{i,x_s}^1 \qquad \text{EQ. 46}$$

$$\bar{\mu}_i^1 = \sum_{x_s} q(x_s) \bar{\mu}_{i,x_s}^1 \qquad \text{EQ. 47}$$

$$\beta_i^1 = \sum_{x_s} q(x_s) \beta_{i,x_s}^1 \qquad \text{EQ. 48}$$

-continued $$\chi_i^1 = \sum_{x_s} q(x_s) \chi_{i,x_s}^1 \qquad \text{EQ. 49}$$

$$\bar{\mu}_j^0 = \sum_{x_s} q(x_s) \bar{\mu}_{j,x_s}^0 \qquad \text{EQ. 50}$$

$$\beta_j^0 = \sum_{x_s} q(x_s) \beta_{j,x_s}^0 \qquad \text{EQ. 51}$$

$$\chi_j^0 = \sum_{x_s} q(x_s) \chi_{j,x_s}^0 \qquad \text{EQ. 52}$$

In Equations 46-52, the frame index k has been omitted for clarity.

At step 414, the particles in the particle set are resampled based on the particle weights. This resampling involves replacing each weighted particle by a set of identical particles at the same position, where the number of particles in each set is based on the weight of the particle. Thus, a highly weighted particle is replaced by a large number of particles and a particle that has a weight of zero is replaced by an empty set containing no particles. The number of particles in each replacement set is calculated by multiplying the weight of the particle being replaced by the total number of particles that are desired in the resampled set. Thus, if four hundred particles are desired after resampling, each particle weight is multiplied by four hundred.

The particles in the resampled set each have the same weight. If there are more frames to process at step 416, this resampled set of particles is randomly shifted at step 404. As a result of this shifting, a set of particles that had all been at the same position in step 414 becomes a distribution of particles around the original particle that formed the set. Together, steps 414 and 404 provide a spread of new particles around the most likely particles from the previous frame. In this way, the location of the object can be tracked while accommodating expected movement in the object. Note that the location of the object in each frame can be estimated from the particles and the particle weights in each frame.

If there are more frames to process at step 416, the next frame is selected at step 402 and steps 404, 406, 408, 410, 412, and 414 are repeated for the new frame. These steps are repeated until the last frame is reached at step 416.

When the last frame is reached, the M-step of the EM algorithm is performed at step 418 by updating the model parameters based on the estimates of the model parameters for each frame. Under one embodiment, the model parameters are updated as the average of the model parameter estimates from the frames. Thus:

$$\alpha_i^1 = \frac{\sum_{k=1}^{K} \alpha_{i,k}^1}{K} \qquad \text{EQ. 53}$$

$$\mu_i^1 = \frac{\sum_{k=1}^{K} \mu_{i,k}^1}{K} \qquad \text{EQ. 54}$$

$$\eta_i^1 = \frac{1}{K} \sum_k \beta_{i,k}^1 - \left[ \frac{1}{K} \sum_k \chi_{i,k}^1 \right]^2 \qquad \text{EQ. 55}$$

$$\mu_i^0 = \frac{\sum_{k=1}^{K} \mu_{i,k}^0}{K} \qquad \text{EQ. 56}$$

$$\eta_i^0 = \frac{\sum_{k=1}^{K} \eta_{i,k}^0}{K} \qquad \text{EQ. 57}$$

$$\eta_j^0 = \frac{1}{K} \sum_k \beta_{j,k}^0 - \left[ \frac{1}{K} \sum_k \chi_{j,k}^0 \right]^2 \qquad \text{EQ. 58}$$

where K is the total number of frames and the notation i,k represents the ith pixel in the kth frame.

The EM algorithm of FIG. 4 may be iterated several times, using the updated model parameters as the prior model parameters in the successive iterations.

As can be seen from the above description, the present invention combines an EM algorithm with particle filtering to allow the position of an object to be tracked while learning the appearance of the object. Embodiments of the present invention also use stereo cameras with particle filtering to perform object tracking. And in general allow object tracking to be performed without requiring a strong prior of the appearance of the object.

Although the present invention has been described with reference to particular embodiments, workers skilled in the art will recognize that changes may be made in form and detail without departing from the spirit and scope of the invention.

What is claimed is:

1. A method comprising:
using a processor to perform the steps of:
receiving at least two frames of image data;
learning a model for the appearance of an object from the at least two frames of image data; and
tracking a changing position of the object in three dimensions from the at least two frames of image data, wherein tracking a changing position comprises representing possible positions as particles, weighting each particle in a set of particles based on the probability that the particle represents the position of the object, and using the weighting of the particles to resample the particles in the set of particles as part of selecting a set of particles for a next frame.

2. The method of claim 1 wherein each frame of image data consists of image data from at least two cameras.

3. The method of claim 1 wherein selecting a set of particles for a next frame further comprises shifting the resampled particles.

4. The method of claim 1 wherein resampling the particles comprises for each particle of a current frame multiplying the weight of the particle by a total number of desired particles for the next frame to identify a number of resampled particles, and placing that number of resampled particles at the position of the particle for the current frame.

5. The method of claim 1 wherein learning a model for the appearance of an object comprises using an expectation-maximization algorithm to learn the model of the appearance.

6. The method of claim 5 wherein the expectation-maximization algorithm further comprises determining a posterior probability for the appearance of the object.

7. The method of claim 6 wherein determining the posterior probability for the appearance of the object comprises determining the posterior probability based on a distribution having a mean that is a function of a prior model of the appearance of the object, a value in the image data determined from a first camera and a value in the image data determined from a second camera.

8. The method of claim 7 wherein the posterior probability comprises a mixture of distributions.

9. The method of claim 8 wherein one of the distributions in the mixture of distributions is weighted based on the correspondence between a value in the image data determined from a first camera and a value in the image data determined from a second camera.

10. The method of claim 8 wherein one of the distributions in the mixture of distributions is weighted based on the correspondence between at least one value in the image data and a prior model of the appearance of the object.

11. The method of claim 1 further comprising determining a model of the appearance of a background.

12. The method of claim 1 wherein:
tracking a changing position of an object comprises designating each of a set of possible positions for the objects as particles and weighting each particle; and
learning a model for the appearance of an object comprises forming a posterior probability of the appearance of the object for each particle, weighting each posterior probability based on the weight of the respective particle, and summing the weighted posterior probabilities for the set of particles.

13. A computer-readable storage medium having encoded thereon computer-executable instructions for the processor to perform steps to track the position of an object and to learn a model of the appearance of the object, the steps comprising:
representing possible positions of the object as particles and weighting each particle; and
determining a posterior probability for the appearance of the object based in part on the weighting of the particles wherein determining a posterior probability comprises determining a separate posterior probability for each particle by utilizing a distribution having a mean that is based on a prior model of the appearance of the object and image data from at least one camera, weighting each separate posterior probability based on the weight of the associated particle, and summing the weighted posterior probabilities to form the posterior probability.

14. The computer-readable storage medium of claim 13 wherein determining a posterior probability comprises using image data from at least two cameras.

15. The computer-readable storage medium of claim 13 wherein determining a posterior probability for each particle further comprises weighting the distribution.

16. The computer-readable storage medium of claim 15 wherein weighting the distribution comprises applying a weight that is based on the correspondence between an image value from a first camera and an image value from a second camera.

17. The computer-readable storage medium of claim 15 wherein weighting the distribution comprises applying a weight that is based on the correspondence between a prior model of the appearance and an image value from at least one camera.

18. The computer-readable storage medium of claim 13 wherein determining a posterior probability forms part of an expectation-maximization algorithm.

19. The computer-readable storage medium of claim 18 wherein the expectation-maximization algorithm further comprises updating model parameters for a model of the appearance of the object based on the posterior probability.

20. The computer-readable storage medium of claim 13 further comprising determining a first set of particles for a first frame of image data and determining a second set of particles for a second frame of image data.

21. The computer-readable storage medium of claim 20 wherein determining a second set of particles comprises selecting the second set of particles based on the weights of the particles in the first set of particles.

22. A method comprising:
using a processor to perform the steps of:
receiving image data from a first camera;
receiving image data from a second camera;
selecting a set of particles for a frame of the image data, each particle representing a possible position for an object;
using the image data from the first camera and the second camera to determine a weight for each particle;
selecting a set of particles for a next frame of the image data based on the weights of the particles; and
using the image data from the first camera and the second camera to determine a posterior probability for the appearance of a pixel in an object, wherein determining a posterior probability further comprises determining a separate posterior probability for each particle in the set of particles by determining a mixture of probability distributions, weighting each separate posterior probability based on the weights of the respective particles, and summing the weighted posterior probabilities to form the posterior probability.

23. The method of claim 22 further comprising using the posterior probability to update model parameters that describe the appearance of the pixel.

24. The method of claim 22 wherein determining a mixture of probability distributions comprises determining a distribution having a mean based on a mean for a prior model of the appearance of the pixel, a value from the image data of the first camera and a value from the image data of the second camera.

25. The method of claim 22 wherein determining a mixture of probability distributions comprises determining a weight for a distribution based on the similarity between a value from the image data of the first camera and a value from the image data of the second camera.

26. The method of claim 22 wherein determining a mixture of probability distributions comprises determining a weight for a distribution based on the degree to which a value in the image data of the first camera and a value in the image data of the second camera match a mean of a prior model for the appearance of the pixel.

* * * * *